United States Patent
Patel et al.

(10) Patent No.: US 10,382,957 B2
(45) Date of Patent: Aug. 13, 2019

(54) SYSTEM AND METHOD FOR MAINTENANCE AND MONITORING OF FILTRATIONS SYSTEMS

(71) Applicant: 3M INNOVATIVE PROPERTIES COMPANY, St. Paul, MN (US)

(72) Inventors: Hemang R. Patel, Middletown, CT (US); Michael N. Cormier, Burlington, CT (US); Justin M. Mazzoni, Cheshire, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 174 days.

(21) Appl. No.: 15/306,169

(22) PCT Filed: Apr. 20, 2015

(86) PCT No.: PCT/US2015/026619
§ 371 (c)(1),
(2) Date: Oct. 24, 2016

(87) PCT Pub. No.: WO2015/164237
PCT Pub. Date: Oct. 29, 2015

(65) Prior Publication Data
US 2017/0048709 A1 Feb. 16, 2017

Related U.S. Application Data

(60) Provisional application No. 61/983,756, filed on Apr. 24, 2014.

(51) Int. Cl.
*B01D 29/60* (2006.01)
*B01D 35/143* (2006.01)
(Continued)

(52) U.S. Cl.
CPC .......... *H04W 12/06* (2013.01); *B01D 29/60* (2013.01); *B01D 35/143* (2013.01);
(Continued)

(58) Field of Classification Search
CPC ..... H04W 12/00; H04W 12/06; H04W 12/08; H04W 84/12; H04Q 9/00; H04Q 2209/40;
(Continued)

(56) References Cited

U.S. PATENT DOCUMENTS 6,471,853 B1 * 10/2002 Moscaritolo ......... B01D 35/143
210/143
9,922,474 B1 * 3/2018 Rice .................... G07C 9/00015
(Continued)

FOREIGN PATENT DOCUMENTS

CN 1569657 1/2005
CN 101222563 7/2008
(Continued)

OTHER PUBLICATIONS

CC3000 (Active) SimpleLink™ Wi-Fi Module from Texas Instruments. SimpleLink Solutions—Wireless Network Solutions. Texas Instruments (www.ti.com/product/cc3000), 6 pgs. (Retrieved Sep. 26, 2013).
(Continued)

*Primary Examiner* — Joseph W Drodge
(74) *Attorney, Agent, or Firm* — Scott A. Baum

(57) ABSTRACT

Aspects of the present disclosure are directed toward methods, apparatuses and systems for operating at a fluid-maintenance site. In certain embodiments, the methods, apparatuses, and systems include a fluid filter, a sensor that provides parameters that characterize fluid flowing through the fluid filter, and a wireless interface circuit. The wireless interface circuit operates in a set-up mode and a normal-
(Continued)

operation mode. In the set-up mode, the wireless interface circuit operates by communicating authentication data with a mobile data-processing device while the mobile data-processing device is proximate to the fluid-maintenance site. In the normal-operation mode, the wireless interface circuit operates by sending the parameters wirelessly, according to the authentication protocol, to a remotely-situated server via a wireless communication medium and a broadband connection.

20 Claims, 4 Drawing Sheets

(51) Int. Cl.

| | | |
|---|---|---|
| B01D 46/00 | (2006.01) | |
| H04Q 9/00 | (2006.01) | |
| H04W 12/06 | (2009.01) | |
| H04W 76/10 | (2018.01) | |
| C02F 1/00 | (2006.01) | |
| H04W 84/12 | (2009.01) | |

(52) U.S. Cl.
CPC ....... B01D 46/009 (2013.01); B01D 46/0086 (2013.01); C02F 1/001 (2013.01); C02F 1/008 (2013.01); H04Q 9/00 (2013.01); H04W 76/10 (2018.02); B01D 2201/56 (2013.01); C02F 2209/008 (2013.01); H04Q 2209/40 (2013.01); H04Q 2209/823 (2013.01); H04W 84/12 (2013.01)

(58) Field of Classification Search
CPC .............. H04Q 2209/823; B01D 17/12; B01D 33/804; B01D 33/806; B01D 33/808; B01D 33/809; B01D 35/143; B01D 46/0086; B01D 61/32; B01D 2201/52; B01D 2201/54; B01D 2201/56; B01D 29/60; B01D 46/009; C02F 1/001; C02F 1/003; C02F 1/004; C02F 1/008; C02F 2209/005; C02F 2209/008; C02F 2209/02; C02F 2209/03; C02F 2209/06; C02F 2209/07; C02F 2209/105; C02F 2209/40; C02F 2209/445; H04L 12/28; H04L 29/06; H04L 29/06095
USPC ...... 96/417, 420, 421, 422, 424; 210/85, 87, 210/90, 96.1, 96.2, 143
See application file for complete search history.

(56) References Cited

U.S. PATENT DOCUMENTS

| | | | |
|---|---|---|---|
| 2003/0205509 A1 | 11/2003 | Barnes | |
| 2004/0238420 A1 | 12/2004 | Oldendorf | |
| 2005/0021959 A1 | 1/2005 | Tsushima | |
| 2005/0096805 A1 | 5/2005 | Fudali | |
| 2006/0060512 A1* | 3/2006 | Astle | B01D 27/101 210/85 |
| 2007/0215531 A1 | 9/2007 | Wawrla | |
| 2007/0215546 A1 | 9/2007 | Watkins | |
| 2008/0078710 A1 | 4/2008 | Larkner | |
| 2008/0314807 A1* | 12/2008 | Junghanns | B01D 61/025 210/85 |
| 2009/0084451 A1 | 4/2009 | Quinn | |
| 2010/0204924 A1 | 8/2010 | Wolfe | |
| 2010/0298662 A1* | 11/2010 | Yu | A61M 1/28 600/301 |
| 2010/0305759 A1 | 12/2010 | Paragot | |
| 2010/0332149 A1 | 12/2010 | Scholpp | |
| 2011/0220560 A1* | 9/2011 | Verdegan | G06Q 10/06 210/90 |
| 2011/0303310 A1 | 12/2011 | Klicpera | |
| 2011/0320134 A1* | 12/2011 | Butler | C02F 1/008 702/25 |
| 2012/0078722 A1 | 3/2012 | Van Oosterwijck | |
| 2012/0239461 A1 | 9/2012 | Teredesai | |
| 2013/0079936 A1 | 3/2013 | Cullen | |
| 2013/0193041 A1 | 8/2013 | Rhode | |
| 2013/0247117 A1* | 9/2013 | Yamada | G08C 17/02 725/93 |
| 2013/0304532 A1* | 11/2013 | Cormier | G06Q 10/06 705/7.15 |
| 2014/0170969 A1* | 6/2014 | Devos | G06F 17/30 455/41.1 |
| 2014/0223715 A1* | 8/2014 | Bippus | B23P 19/04 29/407.01 |
| 2017/0272951 A1* | 9/2017 | Howard | H04W 12/08 |

FOREIGN PATENT DOCUMENTS

| | | |
|---|---|---|
| CN | 201203797 | 3/2009 |
| CN | 201381256 | 1/2010 |
| CN | 101654309 | 2/2010 |
| CN | 101838076 | 9/2010 |
| CN | 201917566 | 8/2011 |
| CN | 102172446 | 9/2011 |
| CN | 102211792 | 10/2011 |
| CN | 202067115 | 12/2011 |
| CN | 202113690 | 1/2012 |
| CN | 202711442 | 1/2013 |
| CN | 202724855 | 2/2013 |
| DE | 20300126 | 4/2003 |
| DE | 102012102918 | 10/2013 |
| JP | 2002268733 | 9/2002 |
| JP | 2003108222 | 4/2003 |
| JP | 2004363809 | 12/2004 |
| JP | 2008/080193 | 4/2008 |
| JP | 2011/028324 | 2/2011 |
| KR | 2009090764 | 8/2009 |
| KR | 2011068727 | 6/2011 |
| TW | 201210243 | 3/2012 |
| WO | WO 2000/078678 | 12/2000 |
| WO | WO 2007/011352 | 1/2007 |
| WO | WO 2007/021252 | 2/2007 |
| WO | WO 2011/142708 | 11/2011 |
| WO | WO 2012/102949 | 8/2013 |
| WO | WO 2013/166069 | 11/2013 |

OTHER PUBLICATIONS

Koubachi. "Wi-Fi Plant Sensor—Quick start guide" (www.koubachi.com/features/sensor), 1 pg. (2012).
"Kitchen Brains® RM-200—remote temperature monitoring solution." (www.KitchenBrains.com), 2 pgs. (2012).
"FilterScan® Air Filter Clog Detector & Service Reminder." CleanAlert—FilterScan product specification sheet, 1 pg. (2012).
"Flow Meter." Savant Electronics Inc. (www.digisavant.com/FlowMeter.aspx), 1 pg. (Retrieved Sep. 26, 2013).

* cited by examiner

SYSTEM AND METHOD FOR MAINTENANCE AND MONITORING OF FILTRATIONS SYSTEMS

BACKGROUND

Many fluid treatment systems include serviceable fluid treatment parts such as filter cartridges, additive dispensers, and the like. These fluid treatment parts have been utilized in both residential and commercial fluid treatment systems. The life of certain fluid treatment parts tends to be limited. In general, it is difficult for a user to know or determine the performance of a fluid treatment system part (e.g. relative to the manufacturer's specifications), and whether it should be removed, replaced, discarded or when a serviceable part should be cleaned or regenerated without the help of sensors. Substandard or flawed performance of a fluid treatment system part can result in the owner unknowingly jeopardizing the integrity of the filtration system.

SUMMARY

Aspects of the present disclosure generally relate to servicing fluid treatment systems, and more specifically, monitoring fluid treatment systems, determining the need for service, and to corresponding service communications. The present disclosure is exemplified in a number of implementations and applications, some of which are summarized below.

Various aspects of the present disclosure are directed toward fluid-filter monitor apparatuses for operating at a fluid-maintenance site. In one such embodiment, a fluid-filter monitor apparatus includes a fluid filter, a sensor that provides parameters that characterize fluid flowing through the fluid filter, and a wireless interface circuit. The wireless interface circuit operates in a set-up mode and a normal-operation mode. In the set-up mode, the wireless interface circuit communicates authentication data (defined by an authentication protocol) with a mobile data-processing device while the mobile data-processing device is proximate to the fluid-maintenance site. In a normal-operation mode, the wireless control circuit sends the parameters wirelessly, according to the authentication protocol, to a remotely-situated server via a wireless communication medium and a broadband connection.

Other aspects of the present disclosure are directed toward apparatuses that include a multiple first fluid-filter monitor and a remotely-situated server. In an example embodiment, such an apparatus includes a first fluid-filter monitor for operating at a first fluid-maintenance site and a second fluid-filter monitor for operating at a second fluid-maintenance site. Each of the first and second fluid-filter monitors include a fluid filter, a sensor that provides parameters that characterize fluid flowing through the fluid filter, and a wireless interface circuit. The remotely-situated server includes a database with entries correlating identification information corresponding to and indicative of the parameters of the respective fluid filters at the first and second fluid-maintenance sites. The remotely-situated server maintains status information based on the parameters, and communicates notifications indicative of the status of each of the first fluid-filter monitor and the second fluid-filter monitor.

Additionally, in this example embodiment, the wireless interface circuit of the first fluid-filter monitor operates in a set-up mode by communicating authentication data (defined by an authentication protocol) with at least one mobile data-processing device, while said at least one mobile data-processing device is proximate to the fluid-maintenance site. The wireless interface circuit of the first fluid-filter monitor also operates in a normal-operation mode by sending the parameters wirelessly, according to the authentication protocol, to the remotely-situated server via a wireless communication medium and a broadband connection. The wireless interface circuit of the second fluid-filter monitor operates in a set-up mode by communicating authentication data over at least one wireless communication medium with said at least one mobile data-processing device, while said at least one mobile data-processing device is proximate to the fluid-maintenance site, the authentication data being defined by an authentication protocol. Further, the wireless interface circuit of the second fluid-filter monitor also operates in a normal-operation mode by sending the parameters wirelessly, according to the authentication protocol, to the remotely-situated server via a wireless communication medium and a broadband connection.

Various aspects of the present disclosure are directed toward methods of operating and maintaining a fluid-filter with a fluid-filter monitor at a fluid-maintenance site. The methods include operating the fluid-filter monitor in a set-up mode, and awaiting operator authentication data. Additionally, the methods include receiving operator authentication data, defined by an authentication protocol, from at least one mobile data-processing device over at least one wireless communication medium, while the mobile data-processing device is proximate the fluid-maintenance site. Further, the methods include initiating a normal-operation mode by sending parameters, according to the authentication protocol, that characterize fluid flowing through the fluid filter, to a remotely-situated server via a broadband communication medium, analyzing the received fluid-filter parameters at the remotely-situated server, and determining if any of the fluid-filter parameters are outside a programmed threshold limit. Additionally, the methods include sending notifications from the remotely-situated server to the mobile data-processing device associated with unique filter-identification information of the fluid-filter monitor. The methods also involve notifying a customer or service provider through the mobile data-processing device associated with unique filter-identification information of the fluid-filter monitor, of the filter monitor parameter outside threshold limit, and subsequently servicing the fluid-filter (bringing the fluid-filter parameter within the threshold limit).

The above summary is not intended to describe each embodiment or every implementation of the present disclosure. The figures and detailed description that follow more particularly exemplify various embodiments.

BRIEF DESCRIPTION OF THE DRAWINGS

The disclosure may be more completely understood in consideration of the following detailed description of various embodiments of the disclosure in connection with the accompanying drawings, in which.

Figure 1:
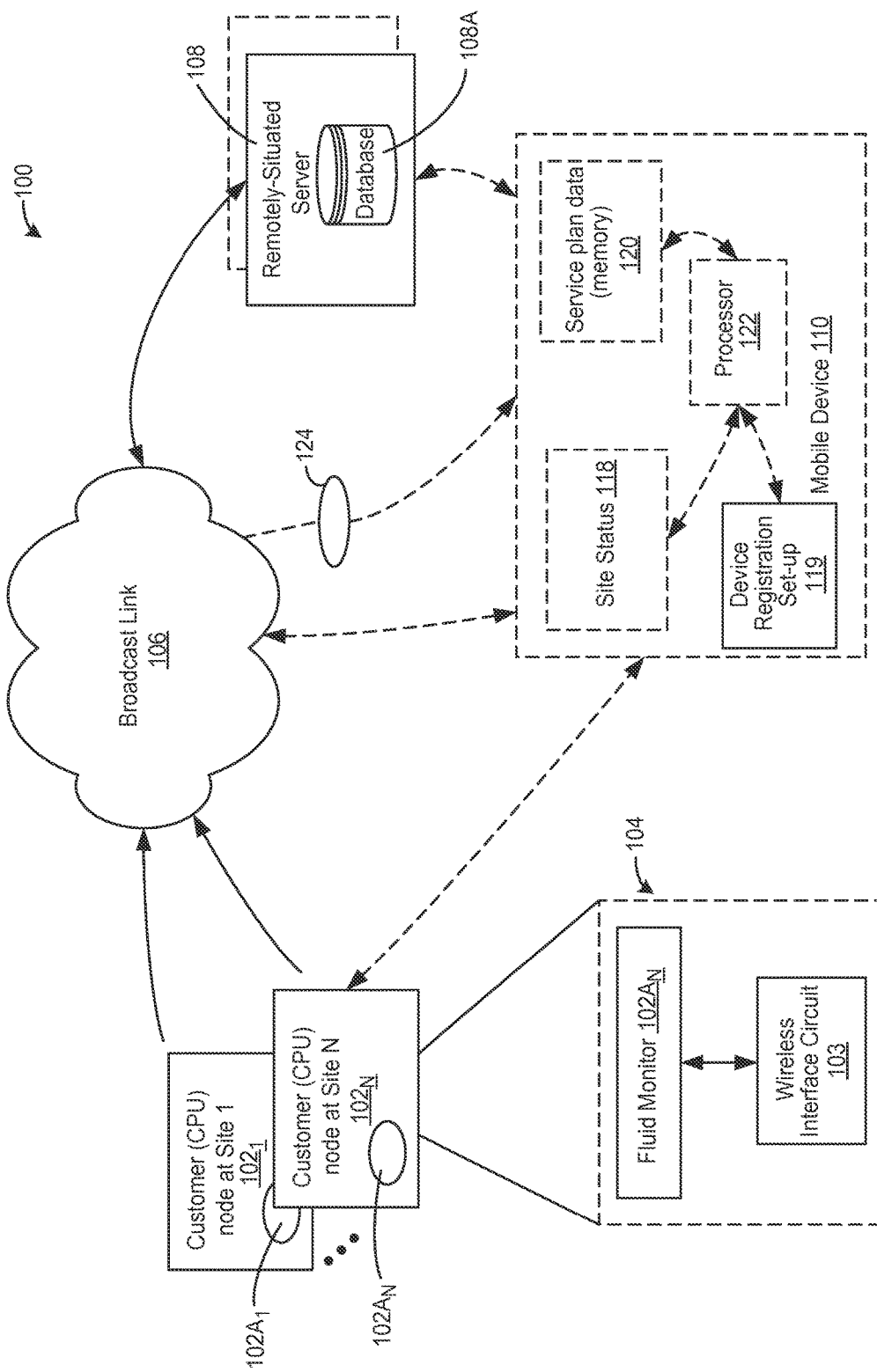
FIG. 1 shows a filter monitoring and communication system, according to example embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure, including aspects defined by the claims.

DETAILED DESCRIPTION

The present disclosure is believed to be useful for monitoring various types of treatment systems and alerting when there is need for servicing the treatment systems. Specific applications of the present disclosure relate to monitoring fluid-filter monitor(s), which can be located at a fluid-maintenance site, and communicating information corresponding to operational or maintenance information for the fluid filter. Fluid monitoring apparatuses, systems and methods, consistent with various aspects of the present disclosure, can monitor a variety of fluid-related parameters including, for example, the effectiveness of the fluid treatment system, the levels of various chemicals used in the system, and filter life for the filters in the system. To determine the effectiveness of the fluid treatment system, the fluid monitoring apparatus can monitor the chemical composition of the fluid coming out of the filter. The monitoring apparatus may also monitor aspects of the fluid treatment system such as flow rate and pressure drop. While the present disclosure is not necessarily limited to such applications, various aspects of the disclosure may be appreciated through a discussion of various examples using this fluid-monitoring context.

Various aspects of the present disclosure are directed toward fluid treatment apparatuses for operating at a fluid-maintenance site. These apparatuses can include a fluid filter, a sensor that provides parameters that characterize fluid flowing through the fluid filter, and a wireless interface circuit. The wireless interface circuit is configured to operate in a set-up mode and in a normal-operation mode. In the set-up mode, the wireless interface circuit is engaged to communicate authentication data (defined by an authentication protocol) with a mobile data-processing device while the mobile data-processing device is proximate to the fluid-maintenance site. Additionally, in the normal-operation mode, the wireless interface circuit can operate by sending the parameters wirelessly (according to the authentication protocol) to a remotely-situated server via a wireless communication medium and a broadband connection. In certain embodiments, the fluid-flow characterizing parameter includes at least one of fluid filter service time, filtered fluid volume, fluid delivery-pressure, filter-induced pressure drop, fluid purity, fluid acidity, fluid temperature, and other chemical or particulate analysis.

In certain embodiments, consistent with various aspects of the present disclosure, apparatuses and methods include a remotely-situated server having a database with entries correlating identification information corresponding to and indicative of the parameters of the fluid filter(s) at fluid-maintenance site(s). The remotely-situated server maintains status information based on the parameters of one or more fluid-filter monitors, and communicates notifications indicative of this status information to a remotely-located database communicatively coupled with and/or co-located with a server. Additionally, the remotely-situated server can access the database for updating and retrieving (for reporting purposes) database entries that correlate the filter status information with operator-identification information and/or with one or more registered mobile data-processing devices.

Additionally, the apparatuses and methods can include multiple fluid filter monitor apparatuses which are useful for overall system operation. Each such fluid filter monitor apparatus includes a fluid filter, a sensor that provides parameters that characterize fluid flowing through the fluid filter, and a wireless interface circuit. In a particular embodiment, a first fluid-monitor can be provided at a first fluid-maintenance site, and a second fluid-monitor can be provided at a second fluid-maintenance site. The wireless interface circuit of the first fluid-filter monitor is configured to initialize and operate a set-up mode by communicating authentication data with a mobile data-processing device while the mobile data-processing device is proximate to the fluid-maintenance site. Additionally, the wireless interface circuit of the first fluid-filter monitor is configured to operate in a normal-operation mode by sending the parameters (indicative of the status/parameters collected by the fluid filter(s)) wirelessly, according to the authentication protocol, to the remotely-situated server via a wireless communication medium and a broadband connection. As one of many possible installations, the wireless interface circuit is wirelessly connected by way of a conventional WiFi router, through which a conventional connection is made to the Internet (or other cellular network) such as through broadband-connection equipment. Examples of broadband-connection equipment include, without limitation, a cable modem or other interface circuit (e.g., DSL, T1 line or other optic line interface circuit) and other such equipment commercially available via Internet Service Providers (ISPs).

Similarly, the wireless interface circuit of the second fluid-filter monitor is configured to operate in a set-up mode by communicating authentication data over at least one wireless communication medium with said at least one mobile data-processing device while said at least one mobile data-processing device is proximate to the fluid-maintenance site, the authentication data being defined by an authentication protocol. Further, the wireless interface circuit of the second fluid-filter monitor can operate in a normal-operation mode by sending the parameters wirelessly, according to the authentication protocol, to the remotely-situated server via a wireless communication medium and a broadband connection.

In certain embodiments, a set of mobile data-processing devices (typically involving more than one server-registerable mobile data-processing device) are programmed to operate in the set-up mode by communicating authentication data wirelessly with the wireless interface circuit according to the authentication protocol. Thereafter, the set of mobile data-processing devices can communicate with the remotely-situated server for accessing information corresponding to operational or maintenance information for the fluid filter. The communication between a mobile data-processing device and the remotely-situated server can be accomplished wirelessly (e.g., over a local wireless network, Bluetooth, or using a radio-frequency (RF) communication protocol), or based on a physical connection (e.g., a Universal Serial Bus (USB) connection, an Ethernet cable, or another similar data communication cable). In certain more specific embodiments, multiple fluid-filter monitor apparatuses (each including a fluid filter, a sensor that provides parameters that characterize fluid flowing through the fluid filter, and a wireless interface circuit, as described in detail above) can communicate with the same remotely-situated server.

Further, in certain embodiments, one or more such mobile data-processing devices is configured to receive data from the remotely-situated server that includes a database with parameters for servicing/monitoring a plurality of fluid-filters associated with one or more subscribing customers. These embodiments are particularly advantageous for use by mobile data-processing devices with downloaded applications that are configured to have identification and/or phone numbers registered in the server's database (and/or the device user's identification) for correlation and access to the stored parameters of particular fluid-filter apparatuses. In more specific applications, this correlation would permit limited accesses based on database-registered mobile data-processing devices being authenticated for accessing particular fluid-filter apparatuses (with the entries identifying the associated database-registered mobile data-processing devices/users/numbers as correlated to the particular fluid-filter apparatuses).

Additionally, the remotely-situated server can monitor a plurality of fluid-filter monitors and notify either a customer or a service provider based on a monitored parameter exceeding a programmed threshold level. Further, in certain embodiments, the remotely-situated server can notify either a customer or a service provider, associated with the fluid-filter, when the fluid-filter monitor fails to transmit the parameters of the fluid filter to the remotely-situated server for a period of time greater than a programmed intermittent parameter upload period of the wireless interface circuit. Moreover, the database of the remotely-situated server can store parameters of the fluid filter and monitor a deviation of each parameter value over time and notify a service provider associated with the filter identification information when the deviation exceeds a programmed threshold value. Additionally, in certain embodiments, the remotely-situated server can notify a mobile data-processing device or a customer associated with the filter identification information when the fluid-filter monitor reports a parameter for filter life that exceeds a threshold value.

In more specific embodiments, the mobile data-processing devices are enabled for location tracking (e.g., via communication of the GPS coordinates and/or via cellular-phone-system triangulation) for tracking such mobile data-processing devices when they might be nearby fluid-filter apparatuses needing service. In such embodiments, the mobile data-processing devices regularly communicate their respective venues to the server as a routine operation, in response to an event such as establishing a connection at a particular site, having serviced a fluid-filter apparatus at a particular site, and/or a query received wirelessly from the server. With these mobile data-processing devices communicating their respective venues to the server, in response to the server receiving or detecting that a fluid filter is due for service, the mobile data-processing devices that are in closest proximity to the fluid filter can be notified and a service call or appointment can be conveniently and promptly established.

Additionally, each of the fluid-filter monitor apparatuses can communicate parameters of each of the fluid-filters to the remotely-situated server by assigning one of the wireless interface circuits of the two fluid-filter monitor apparatuses as a master and the other wireless interface circuit as a slave. The slave wireless interface circuit can receive fluid-filter parameters from the local sensor and transmit the parameters to the master wireless interface circuit. Further, the master wireless interface circuit can receive the transmission from the slave wireless interface circuit, receive fluid-filter parameters from the other local sensor, and transmit the parameters of the two fluid-filters to the remotely-situated server.

The embodiments and specific applications discussed herein may be implemented in connection with one or more of the above-described aspects, embodiments and implementations, as well as with those shown in the appended figures.

Turning now to the figures, FIG. 1 illustrates an example fluid-filter monitor system 100 consistent with various embodiments of the present disclosure. The system 100 includes multiple customer sites $102_{1-N}$ which include fluid filters. A fluid monitoring apparatus 104 is provided at each of the multiple customer sites 102. The fluid monitoring apparatuses 104 include a fluid monitor $102A_N$ and a wireless interface circuit 103. Included with each of the fluid monitors $102A_N$ is a sensor (not shown) that provides parameters that characterize fluid flowing through the fluid filter. The wireless interface circuit 103 operates in a set-up mode and a normal operation mode. In the set-up mode, the wireless interface circuit 103 communicates authentication data with a mobile data-processing device 110, while the mobile data-processing device 110 is proximate to the customer sites $102_{1-N}$. The authentication data is defined by an authentication protocol. Additionally, in the normal-operation mode, the wireless interface circuit 103 operates by sending the parameters wirelessly, according to the authentication protocol, to a remotely-situated server 108 via a wireless communication medium and a broadband connection (a broadcast link 106). In the set-up mode, a device registration set-up circuit 119 communicates authentication data with the wireless interface circuit 103, while the mobile data-processing device is proximate to the fluid monitoring apparatus 104.

The mobile data-processing device 110 can be carried by a service professional or individual seeking information regarding the sensor of the fluid monitors $102A_N$. In this manner, the two modes of the wireless interface circuit 103 allow for verification of the authenticity of a particular mobile data-processing device 110, such that access to the parameters collected by the sensor is controlled and/or monitored. As discussed in further detail below, the mobile data-processing device 110 can connect to the sensor of the fluid monitors $102A_N$ through the broadcast link 106, physically (e.g., a cable), or over a local internet or another communication medium).

The mobile data-processing device 110 can also, in certain embodiments, send and receive information regarding site status 118. The mobile data-processing device 110 can also include a memory 120 (implemented as a stand-alone memory circuit and/or as part of a computer-based node) that stores various types of information, including service plan information. The memory 120 can be configured to store a service plan application 124, which can be downloaded from broadcast link 106. In other embodiments, the service plan application 124 is transferred to the mobile data-processing device 110 from a memory plug or a disk. The service plan application 124 can be updated in real time based on new status information, for example, as conveyed from the mobile device user or other network devices. The mobile device retrieves information for or from a fluid monitoring apparatus 104 while a service agent is on site, for coordination with a network server at a remote location.

The mobile data-processing device 110 can also access information stored in the remotely-situated server 108. In certain embodiments, the service provider or customer downloads information relating to specific customer sites, including the sensor readings obtained by the plurality of fluid monitoring apparatuses 104 at each customer site. The downloaded information may be data processed by either of the fluid monitoring apparatus 104, the remotely-situated server 108 or both, or a combination of sensor readings and processed data. Where the data is processed by the processor 122 of the mobile data-processing device 110, site status data 118 will indicate whether a fluid monitoring apparatuses 104 of a customer site is in need of service and, if available, what type of service is needed. Based on the determination of service by the site status data 118, the processor 122 can request service plan data from memory 120 to determine whether such a service is covered by the customer site's existing service plan, or if the site is covered by a service plan at all. From the mobile data-processing device 110, the customer may also request service via a wireless communication to the remotely-situated server 108 which forwards the communication to a service provider associated with the customer site 102 and/or fluid monitoring apparatus 104.

The remotely-situated server 108, as discussed above, includes a database 108A with entries correlating identification information corresponding to and indicative of the parameters of the respective fluid filters at the customer sites 102. Additionally, the remotely-situated server 108 maintains status information based on the parameters (in the database 108A), and communicates notifications indicative of the status of each of the fluid monitors $102A_N$.

Figure 2:
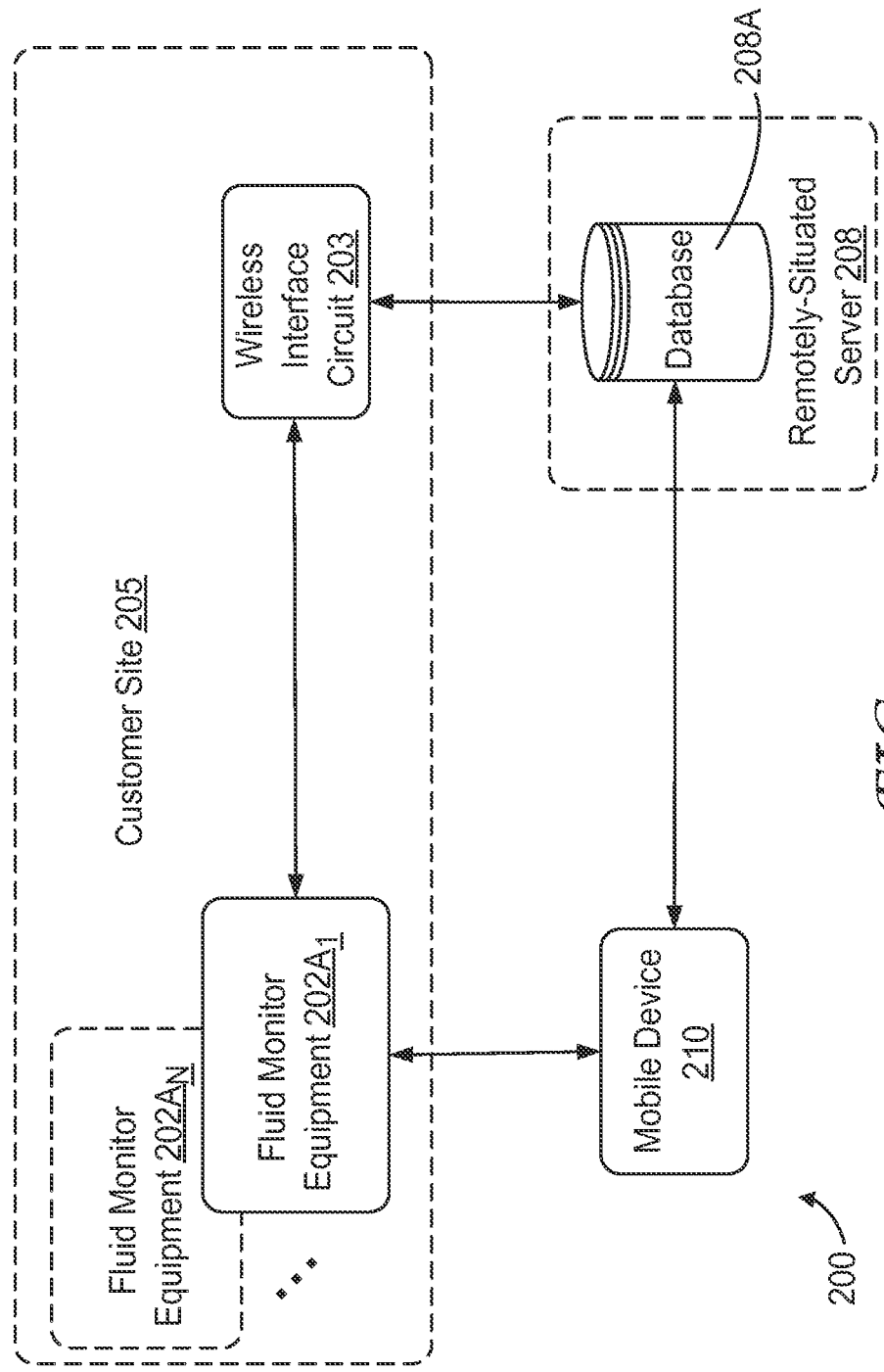
FIG. 2 shows another filter monitoring and communication system, consistent with example embodiments of the present disclosure.

FIG. 2 illustrates another exemplary fluid-filter monitoring system 200 consistent with various embodiments of the present disclosure. The fluid-filter monitoring system 200 includes a customer site 205, a mobile device 210, and a remotely-situated server 208. The customer site 205 can include a plurality of fluid monitor equipment devices $202A_{1-N}$, and at least one wireless interface circuit 203. Each of the fluid monitor equipment devices $202A_{1-N}$ monitors fluid-flow characteristics of fluid-filters via a number of sensors. At certain customer sites, a number of fluid monitor equipment devices $202A_{1-N}$ are necessary to monitor all aspects of a fluid-maintenance site (customer site 205). In such a fluid-filter monitoring system 200, the fluid monitor equipment devices $202A_{1-N}$ "piggy-back" off of one another's wireless interface circuit 203. Specifically, and using any of a number of master-slave (ad hoc) standardized communication protocols, the wireless interface circuits of the plurality of fluid monitor equipment devices $202A_{1-N}$ can select a master wireless interface circuit and assign the rest of the wireless interface circuits of the remaining fluid monitor equipment devices $202A_{1-N}$ as slaves. The slave wireless interface circuit(s) communicates the fluid-flow characteristic parameters of its respective fluid-filter to the master wireless interface circuit 203. The master wireless interface circuit 203 receives these parameters for the slave fluid-filters and sends these parameters, along with the fluid-flow characteristic parameters for its respective fluid-filter to a remotely-situated server 208. A database 208A of the remotely-situated server 208 records the received parameters of each of the fluid-filters. Upon request, such data in the database 208A may be accessed by the mobile device 210 associated with the customer site 205, such as the customer or their service provider.

Figure 3:
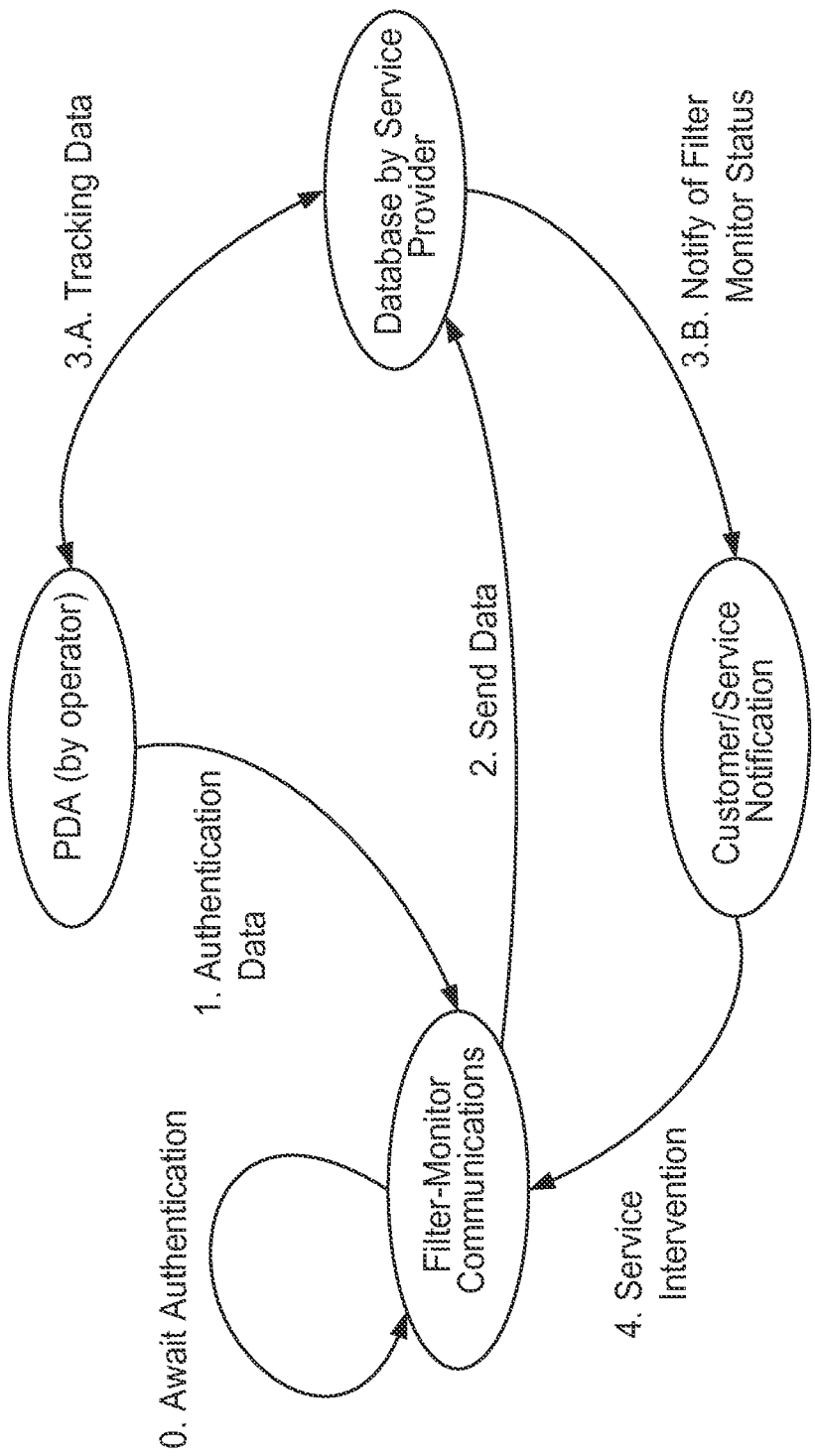
FIG. 3 is a data flow diagram illustrating various operations and data flow for a filter monitoring and communication system, consistent with example embodiments of the present disclosure.

FIG. 3 is a data flow diagram illustrating various operations and data flow for a filter monitoring and communication system, consistent with various aspects of the present disclosure. These illustrated operations and data flow can be understood with reference to the above-discussed aspects described in connection with FIG. 1, including a filter-monitoring communications circuit 103 installed as part of the filter-monitoring apparatus 104. As discussed further below, the filter-monitoring communications circuit 103 communicates with a remotely-situated (CPU) server 108 having access to a database 108A. In one specific embodiment, the filter-monitoring communications circuit 103 can be implemented using a wireless network computer processor (platform) module that is programmed to receive sensor-provided output signals for the targeted environment. For fluid-specific applications such as described in connection with FIG. 3, the targeted environment is fluid (e.g., as installed in the fluid path for a residential/commercial system delivering a specific type of fluid), and the sensor-provided output signals are the above-described fluid-related parameters detected by the fluid monitoring apparatus. In these applications, the wireless network computer processor module can be implemented using the CC3000 module (available from Texas Instruments) which is a self-contained wireless network processor providing Internet connectivity via integrated WiFi communication; the CC3300 module includes a programmable host microcontroller (MCU) and is used for embedded applications. Other applications include those generally directed to monitoring temperatures of targeted objects and/or monitoring gases (including air quality), as can be implemented using wireless smart sensors such as commercially available from companies such as Kitchen Brains. In such applications, the targeted objects/environments can be associated with foods, plants and/or other nutrition mediums including, e.g., soil and containers in which they are contained or based), and the sensor-provided output signals are the monitor-provided parameters detected by the monitoring apparatus.

Turning now to the exemplary fluid-specific data flow diagram of FIG. 3, a filter-monitor communications circuit, awaits authentication (step 0) from a mobile-communication device (e.g., personal digital assistant or "PDA"). A service provider arrives at a customer site to set-up the fluid-filter monitoring system. As shown via Step 1 in FIG. 3, the service provider transmits authentication data, via the mobile-communication device, over a short-distance wireless communication medium (Bluetooth, ZigBee, WiFi, etc.). The authentication data can include connection-authorization information for connecting to a local WiFi network for transmitting fluid-flow characterizing parameters to a remotely-situated server, as well as information that associates the fluid-filter monitoring system to a service provider and/or customer. After set-up of the fluid-filter communications system, the filter-monitor communications circuit regularly transmits data (step 2), including fluid-flow characteristic parameters of the fluid-filter, to a service provider database. The data collected by the service provider database can be unprocessed data as provided directly from a sensor of the fluid-filter monitor, or the data may be processed (e.g., data-validation screening and interpretation to higher level codes) prior to transmission by the filter-monitor communications circuit to the service provider database.

In certain embodiments, both processed and unprocessed data are sent to the service provider database as a function of data being collected by the filter-monitoring apparatus. For instance, in situations involving an abundance of data concerning poor-quality fluids, processed data might initially be reported and, in light of ongoing/potential cumulative information and a potential overload of processing by the circuitry executing the analysis of the data, samples of unprocessed data is then sent to the server and/or server-accessed database. In response, the server or another computer with access to the unprocessed data then analyzes the data before determining that the data requires a notification to the customer or service provided as would be identified through the correlating database entries. Accordingly, the service provider database stores the received data, and aggregates the data from a plurality of customer sites, with the amount of processing that occurs in the fluid monitoring apparatus varying depending on the application.

This stored data is retrieved (Steps 3A and 3B) from the database, via a server, by a mobile communication device. The mobile communication device, based on the received data and subsequent processing (if necessary), displays the status of the fluid filter to the operator (e.g., the customer or an authorized maintenance personnel as identified and correlated in the database for the fluid filter). Where the service provider database includes data that indicates when the fluid-filter status requires service (Step 3B) the service provider database notifies a customer and/or service provider associated with the fluid filter. The customer/service provider performs the service (Step 4) which causes a status update to be sent to the database, thereby removing the service-need status associated with the fluid filter.

In certain embodiments, the data collected in Step 2 includes a variety of information regarding the functionality of the fluid treatment system. The information can include data regarding flow rate, pressure drop, capacity of filters and longevity of filters. A fluid monitoring apparatus located at the customer site, and connected to the fluid treatment system, can compare raw data regarding flow rate, etc. to set points stored in a database in an intermediary step. The set points can be based on threshold tolerances of the fluid treatment system. In certain embodiments, if the data collected falls below (or crosses above) a set point, a change in status for the fluid treatment system is recorded. The status of the fluid treatment system can indicate that at least a portion of the fluid treatment system is in need of service. The threshold can be set so that service does not need to be done immediately, but rather serves as a warning that a filter will soon need to be replaced, for example. In certain embodiments, the step 2 data is sent to the database each time a status of the fluid treatment system changes. In other embodiments, the data may be sent, in step 2, at regular time intervals or in response to a query by the remotely-situated server. The data can be sent, in step 2, over the Internet (e.g., cellular, WiFi, or another communication mechanism by which the filter-monitor communications circuit can send and receive information over the Internet).

As denoted by Step 3A, communications between the mobile data-processing devices (or PDAs) can be enabled for location tracking (e.g., via communication of the GPS coordinates) for tracking the mobile data-processing devices and notifying them when they might be nearby fluid-filter apparatuses needing service. In such embodiments, the mobile data-processing devices receive communications from the server, as prompted by the database, and thereby conveniently act to provide service in response to receiving notifications of fluid filters needing service. Efficiency is realized by the mobile data-processing devices being notified when they are in close proximity to the fluid filter.

Figure 4:
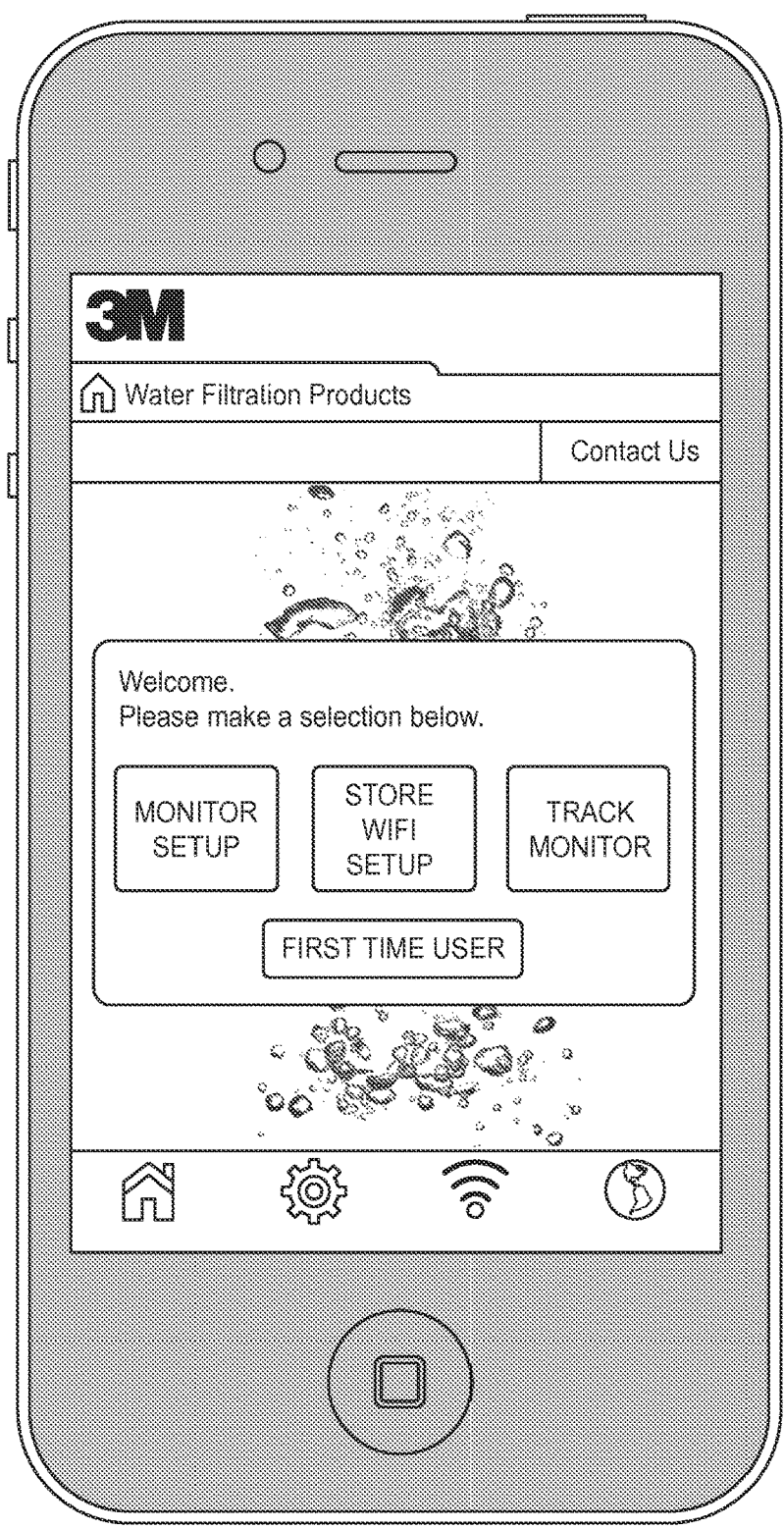
FIG. 4 shows a mobile-communication device operating in a filter set-up mode, consistent with example embodiments of the present disclosure.

FIG. 4 shows a user interface of a fluid-filter monitoring application on a mobile-communication device, consistent with embodiments of the present disclosure. Such an application on a mobile-communication device can be used to wirelessly communicate with both a remotely-situated server and a plurality of fluid-filter monitoring apparatuses proximate the mobile-communication device. The application provides two modal functions. In a fluid-filter monitor set-up mode, the mobile-communication device communicates authentication data to the fluid-filter monitoring apparatus, including the information necessary to wirelessly communicate to a local WiFi network, as well as manufacturer suggested filter specifications (e.g., minimum and maximum flow rate, life expectancy, filtering rates for particulate and chemicals). These filter specifications can be used by the fluid-filter monitoring apparatus to determine on site status of a fluid-filter, which can be communicated to a mobile-communication device on site, e.g., to confirm, after service, proper operation of a fluid-filter system. This same application can also be used during a normal-operation mode of the filter system. For example, while the mobile-communication device associated to a filter system is remote from the filter system site, the mobile-communication device can communicate with a remotely-situated server to be appraised of a fluid-filter's status at a remote site.

In certain embodiments, sensors communicate information to a local wireless interface, which then provides the information to a remotely-situated server. The sensors may also communicate directly with a mobile communication device via the wireless interface. The wireless interface circuit can use a wireless communication approach and system as discussed above, to communicate information to a local mobile communication device. The wireless interface circuit may be connected using Wi-Fi or other wireless internet-based communication protocol to a broadcast link and ultimately to the remotely-situated server. Additionally, for further information regarding fluid monitoring equipment (and communications/service-deployment with such equipment) consistent with various aspects of the present disclosure, reference may be made to U.S. Patent Publication No. 2013/0304532 to Michael N. Cormier et al. and as cited therein, to U.S. Pat. No. 7,638,042 to Robert E. Astle et al., entitled, "System for Monitoring the Performance of Fluid Treatment Cartridges," and U.S. Pat. No. 6,332,110 to Thomas D. Wolfe, entitled, "Method for Monitoring Advanced Separation and/or Ion Exchange Processes," which are herein incorporated by reference. Such background discussion includes use of one or more sensors, and the sensors, as noted above, can collect other information (in addition or alternatively to collecting fluid flow information) regarding the functioning of the fluid treatment system. For instance, another sensor can monitor pressure drop set points, and still another can measure longevity (time in service) set points.

In certain embodiments, fluid monitors, consistent with various aspects of the present disclosure collect parameters from each sensor and transmits those parameters via a broadcast link to a remotely-situated server. The remotely-situated server determines whether any portion of the fluid treatment system is in need of service based on the received parameters, or approximately how long until service may be needed. A database of the remotely-situated server can store information regarding performance expectations for the fluid monitoring system. The remotely-situated server can compare the information gathered by the fluid monitors to the parameters stored in the database. Based on the comparison, the remotely-situated server 108 makes a determination regarding the need for service. The database can also store information regarding the last time that service was preformed, for example. The database stores information regarding the location of a customer site and a fluid monitor that is provided to the remotely-situated server. The location information can be sent, for example, to a mobile device via a broadcast link.

A remotely-situated server, consistent with various aspects of the present disclosure, can also use information regarding the identity (e.g., a venue ID) of the fluid-filter treatment system or the location of the fluid-filter treatment system to determine which customer or service provider (or a mobile device) can access information a customer site. The venue ID or other identifying information regarding a fluid monitor can be used by the remotely-situated server (or the mobile device) to determine the location of the customer site. In certain embodiments, the venue ID is sent along with status and usage information though the broadcast link to the remotely-situated server, or the mobile device. The venue ID can be used to retrieve information regarding the customer site or fluid monitor that is stored in the database within the remotely-situated server, or associated with a service provider, customer and/or or mobile device.

Fluid monitoring apparatuses, in certain embodiments, can be configured at multiple customer sites and send information collected from sensors through a broadcast link to a remotely-situated server 108. The remotely-situated server can be a remotely accessible computer-based node including a database and a logic circuit such as a computer programmed for interfacing between the database and the elements communicatively coupled thereto as shown in FIG. 1. In certain embodiments, the data sent to the remotely-situated server is data that has been processed by fluid monitoring apparatus, for example, to convert raw data provided by the sensors to a predetermined format common to different types of sensors or more-readily interpreted by the elements (e.g., the remotely-situated server, and/or mobile device) accessing the data for further processing. In other embodiments, the information collected by the fluid monitoring apparatus is passed through the broadcast link to the remotely-situated server unprocessed. In certain embodiments, the processor in the remotely-situated server further processes the data received in order to aggregate information regarding the fluid treatment systems at a number of customer sites. The processor can also determine if one or more customer sites require service, and determine when each of the fluid treatment systems needs routine service.

Various embodiments of the present disclosure include processing information collected from sensors within fluid monitoring apparatus at one or more locations. For example, processing can occur at the customer sites (e.g., via a fluid monitor), and/or at a remotely-situated server. In other embodiments, the processing occurs almost exclusively at the remotely-situated server and s mobile device associated therewith. Various combinations of processing occurring at the customer sites, on a mobile device's processor, and on remotely-situated server are possible. In certain embodiments, processing sensor data from the fluid monitors involves certain steps that require controlled access to the data stored at the database of the remotely-situated server. Such access can involve a service provider entering a user's name and password at a login interface. In response, service providers can access different categories of information based, for example, on a business agreement (monthly-access fees) and/or information specific to the service providers. An example of such controlled-information access is employee-access profiles which the service providers would set in advance to control which employees can access information. This controlled access can limit, block or provide authorized employees access to information such as proprietary customer information, customer preferences, critical issues outstanding, and other data that is critical to the businesses of the service providers.

Various modules and/or other circuit-based building blocks may be implemented to carry out one or more of the operations and activities described herein and/or shown in the figures. In such contexts, a "module" is a circuit that carries out one or more of these or related operations/activities. For example, in certain of the above-discussed embodiments, one or more modules are discrete logic circuits or programmable logic circuits configured and arranged for implementing these operations/activities, as in the circuit modules shown in the Figures (e.g., the wireless interface circuit of FIG. 1). In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Further, certain embodiments are directed to a computer program product (e.g., nonvolatile memory device), which includes a machine or computer-readable medium having stored thereon instructions which may be executed by a computer (or other electronic device) to perform these above-described operations/activities.

Based upon the above discussion and illustrations, it is readily recognizable that various modifications and changes may be made to the present disclosure without strictly following the exemplary embodiments and applications illustrated and described herein. For example, a variety of different types of registers, communication protocols and data can be communicated using one or more approaches as discussed herein. Such modifications do not depart from the true spirit and scope of the present disclosure, including that set forth in the following claims.

What is claimed is:

1. A fluid-filter monitor apparatus for operating at a fluid-maintenance site, the fluid-filter monitor apparatus comprising:
 a fluid filter, one or more sensors configured and arranged to provide parameters that characterize fluid flowing through the fluid filter, and a wireless interface circuit;
 the wireless interface circuit configured and arranged to
  operate in a set-up mode by communicating authentication data over a short-distance wireless communication medium with a mobile data-processing device while the mobile data-processing device is proximate to the fluid-maintenance site, the authentication data being defined by an authentication protocol and including connection-authorization information for connecting to a local WiFi network for communication to a remotely-situated server; and
  operate in a normal-operation mode by sending the parameters wirelessly, according to the authentication protocol, to the remotely-situated server via a wireless communication medium and a broadband connection.

2. The fluid-filter monitor apparatus of claim 1, further including the remotely-situated server, wherein the remotely-situated server includes a database with entries correlating the parameters with filter-identification information corresponding to the fluid filter.

3. The fluid-filter monitor apparatus of claim 1, further including the remotely-situated server, wherein the remotely-situated server includes a database with entries correlating filter-identification information or the fluid filter with operator-identification information corresponding to the mobile data-processing device.

4. The fluid-filter monitor apparatus of claim 1, further including a set of mobile data-processing devices including the mobile data-processing device, wherein the set of mobile data-processing devices is configured and arranged with a program to operate in the set-up mode by communicating authentication data wirelessly with the wireless interface circuit according to the authentication protocol and, thereafter, to communicate with the remotely-situated server database for accessing information corresponding to operational or maintenance information for the fluid filter.

5. The fluid-filter monitor apparatus of claim 1, further including a set of mobile data-processing devices including the mobile data-processing device, wherein the set of mobile data-processing devices is configured and arranged with a program to operate in the set-up mode by communicating authentication data with the wireless interface circuit according to the authentication protocol and, thereafter, to communicate with the remotely-situated server database wirelessly for accessing information corresponding to operational or maintenance information for the fluid filter.

6. The fluid-filter monitor apparatus of claim 1, further including the remotely-situated server and the mobile data-processing device, wherein the remotely-situated server includes a database with entries correlating the parameters with filter-identification information corresponding to the fluid filter and correlating the identification information of the fluid filter with operator-identification information corresponding to the mobile data-processing device, and wherein the mobile data-processing device is configured and arranged with a program to operate in the set-up mode by communicating authentication data with the wireless interface circuit according to the authentication protocol, and wherein a set of mobile data-processing devices including the mobile data-processing device are configured and arranged to communicate with the remotely-situated server database for accessing information corresponding to operational or maintenance information for the fluid filter.

7. The fluid-filter monitor apparatus of claim 1 comprising a first fluid-filter monitor apparatus, another fluid-filter monitor apparatus according to claim 1 comprising a second fluid-filter monitor apparatus, and where each of the first fluid-filter monitor apparatus and the second fluid-filter monitor apparatus are configured and arranged to communicate with the remotely-situated server.

8. The fluid-filter monitor apparatus of claim 7, wherein the first fluid-filter monitor apparatus and the second fluid-filter monitor apparatus are located proximate one another at the fluid-maintenance site, and configured and arranged to communicate parameters of each of the fluid-filters to the remotely-situated server by assigning one of the wireless interface circuits of the two fluid-filter monitor apparatuses as a master and the other wireless interface circuit as a slave,
the slave wireless interface circuit configured and arranged to receive fluid-filter parameters from the sensor of the first fluid-filter monitor apparatus and transmit the parameters to the master wireless interface circuit, and
the master wireless interface circuit configured and arranged to receive the transmission from the slave wireless interface circuit, receive fluid-filter parameters from the sensor of the second fluid-filter monitor apparatus, and transmit the parameters of the first fluid-filter monitor apparatus and the second fluid-filter monitor apparatus to the remotely-situated server.

9. An apparatus comprising:
a first fluid-filter monitor for operating at a first fluid-maintenance site and a second fluid-filter monitor for operating at a second fluid-maintenance site, each of the first and second fluid-filter monitors including a fluid filter, one or more sensors configured and arranged to provide parameters that characterize fluid flowing through the fluid filter, and a wireless interface circuit,
a remotely-situated server includes a database with entries correlating identification information corresponding to and indicative of the parameters of the respective fluid filters at the first and second fluid-maintenance sites,
wherein the wireless interface circuit of the first fluid-filter monitor is configured and arranged to
operate in a set-up mode by communicating authentication data over a short-distance wireless communication medium with at least one mobile data-processing device while said at least one mobile data-processing device is proximate to the fluid-maintenance site, the authentication data being defined by an authentication protocol and including connection-authorization information for connecting to a local WiFi network for communication to the remotely-situated server; and
operate in a normal-operation mode by sending the parameters wirelessly, according to the authentication protocol, to the remotely-situated server via a wireless communication medium and a broadband connection; and
wherein the wireless interface circuit of the second fluid-filter monitor is configured and arranged to
operate in a set-up mode by communicating authentication data over a short-distance wireless communication medium with said at least one mobile data-processing device while said at least one mobile data-processing device is proximate to the fluid-maintenance site, the authentication data being defined by an authentication protocol and including connection-authorization information for connecting to the remotely-situated server; and
operate in a normal-operation mode by sending the parameters wirelessly, according to the authentication protocol, to the remotely-situated server via a wireless communication medium and a broadband connection, and wherein the remotely-situated server is configured and arranged to maintain status information based on the parameters, and to communicate notifications indicative of the status of each of the first fluid-filter monitor and the second fluid-filter monitor.

10. The apparatus of claim 9, further including said at least one mobile data-processing device programmed and arranged to access information stored at the remotely-situated server database and corresponding to operational or maintenance information for at least one of: the fluid filter at the first fluid-maintenance site and the fluid filter at the second fluid-maintenance site.

11. The apparatus of claim 9, wherein the database entries further correlate the identification information with a user authorized to access information on the database regarding at least one of the respective fluid filters at the first and second fluid-maintenance sites.

12. The apparatus of claim 9, wherein the database entries further correlate the identification information with said at least one mobile data-processing device authorized to access information on the database regarding at least one of the respective fluid filters at the first and second fluid-maintenance sites.

13. The apparatus of claim 9, wherein the database entries further correlate the identification information with: a user authorized to access information on the database regarding at least one of the respective fluid filters at the first and second fluid-maintenance sites, and said at least one mobile data-processing device authorized to access information on the database regarding at least one of the respective fluid filters at the first and second fluid-maintenance sites.

14. The apparatus of claim 9, wherein the parameters includes at least one of fluid filter service time, filtered fluid volume, fluid delivery-pressure, filter-induced pressure drop, fluid purity, fluid acidity, fluid temperature, and other chemical or particulate analysis.

15. The apparatus of claim 9, wherein the remotely-situated server is configured and arranged to monitor a plurality of fluid-filter monitors and notify either a customer or a service provider based on monitored parameters exceeding a programmed threshold level.

16. The apparatus of claim 9, wherein the remotely-situated server is configured and arranged to notify either a customer or a service provider, associated with the fluid-filter, when one of the fluid-filter monitors fails to transmit the parameters of the fluid filter to the remotely-situated server for a period of time greater than a programmed intermittent parameter upload period of the wireless interface circuit.

17. The apparatus of claim 9, wherein the mobile data-processing device is configured and arranged to receive data from the remotely-situated server database including parameters for a plurality of fluid-filters associated with a customer, or another plurality of fluid-filters associated with a service provider.

18. The apparatus of claim 9, wherein the database of the remotely-situated server is configured and arranged to store parameters of the fluid filters and monitor a deviation of each parameter value over time and notify a service provider associated with filter-identification information when the deviation exceeds a programmed threshold value.

19. The apparatus of claim 9, wherein the remotely-situated server is configured and arranged to notify a mobile data-processing device or a customer associated with filter-identification information when one of the fluid-filter monitors reports a parameter for filter life that exceeds a threshold value.

20. A method of operating and maintaining a fluid-filter with a fluid-filter monitor at a fluid-maintenance site including:
operating the fluid-filter monitor in a set-up mode, and awaiting operator authentication data;
receiving operator authentication data, defined by an authentication protocol and including connection-authorization information for connecting to a local WiFi network for communication to a remotely-situated server, from at least one mobile data-processing device over a short-distance wireless communication medium, while the at least one mobile data-processing device is proximate the fluid-maintenance site;
initiating a normal-operation mode by sending parameters, according to the authentication protocol, by one or more sensors that characterize fluid flowing through the fluid filter, to the remotely-situated server via a broadband communication medium;
analyzing the parameters at the remotely-situated server, and determining if any of the parameters are outside a programmed threshold limit;
sending notifications from the remotely-situated server to the mobile data-processing device associated with unique filter-identification information of the fluid-filter monitor;
notifying a customer or service provider through said at least one of mobile data-processing device, associated with unique filter-identification information of the fluid-filter monitor, of a parameter that is outside the programmed threshold limit, if any of the parameters are outside a programmed threshold limit; and
servicing the fluid-filter, and thereby bringing the parameter that is outside the programmed threshold limit within the programmed threshold limit.

* * * * *